Figure 1:
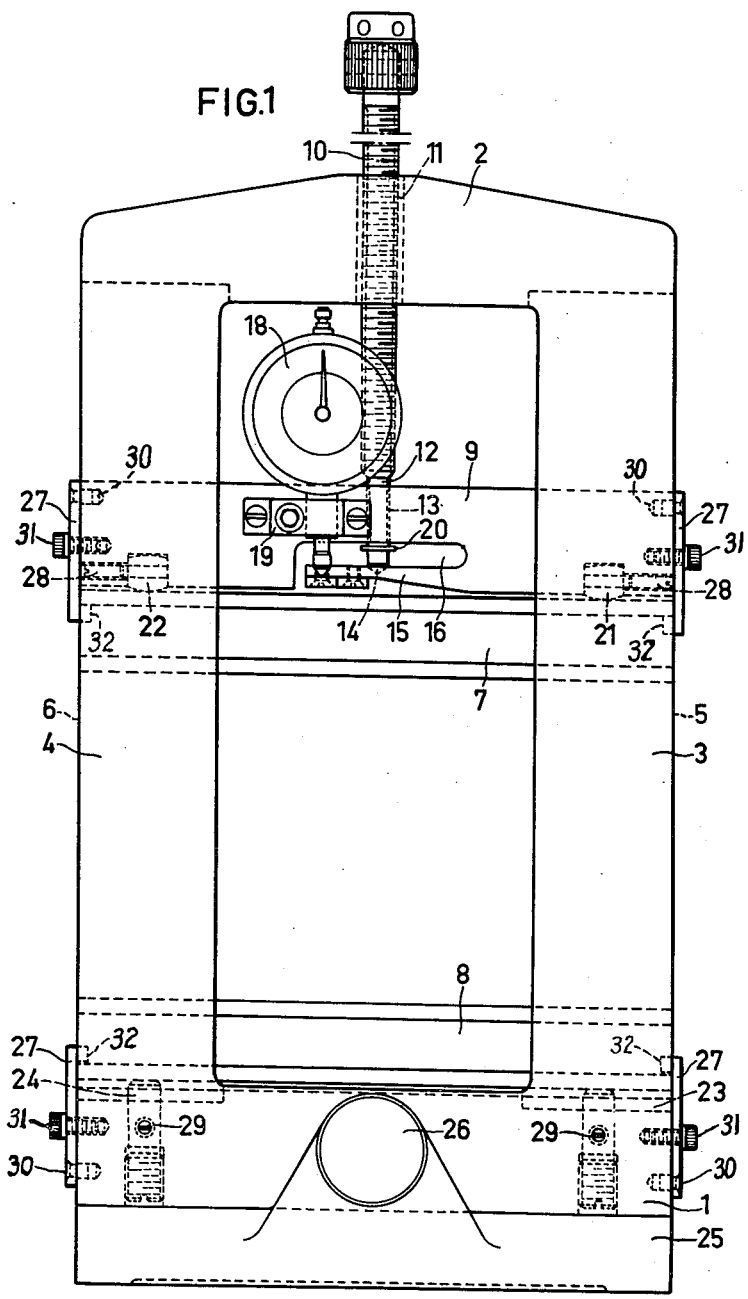

June 6, 1961

B. E. EDENHOLM ET AL 2,986,818

GAUGE BLOCK HOLDERS

Filed May 26, 1958

2 Sheets-Sheet 1

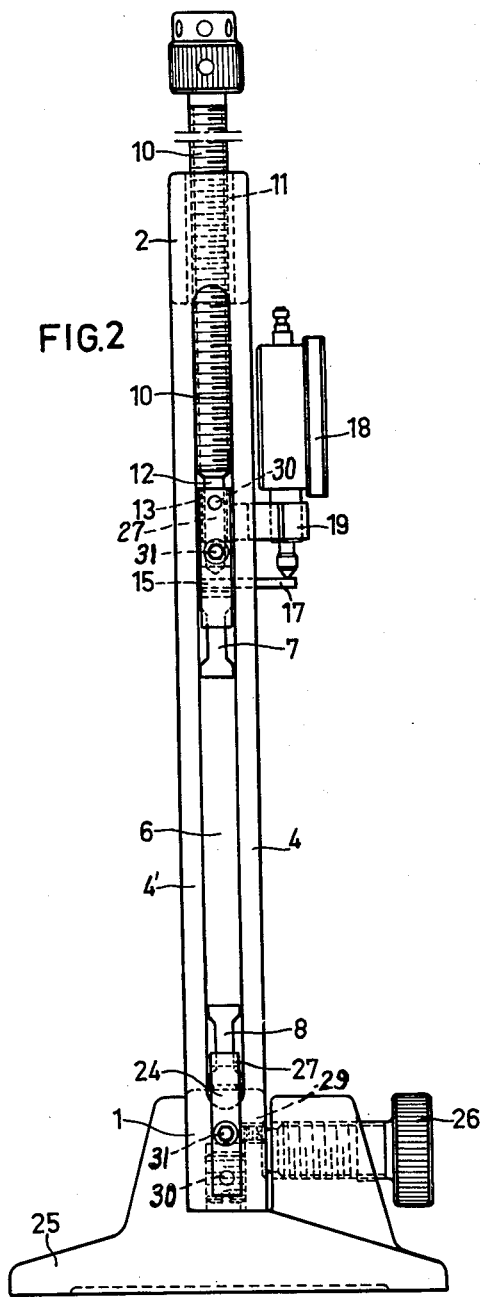

United States Patent Office 2,986,818
Patented June 6, 1961

2,986,818
GAUGE BLOCK HOLDERS
Bert E. Edenholm and Lars Evald Holger Larsson, Eskilstuna, Sweden, assignors to Aktiebolaget C. E. Johansson, Eskilstuna, Sweden, a Swedish company
Filed May 26, 1958, Ser. No. 737,587
4 Claims. (Cl. 33—168)

This invention relates to a gauge block holder and more specifically to means for applying a precisely controlled pressure on one or more sets of gauge blocks in a gauge block holder.

In order to obtain accurate measuring values with gauge blocks when exposing a set of gauge blocks to a compressing force in a gauge block holder it is essential that the blocks of the set be forced against each other by an exactly controllable force. With conventional gauge block holders the gauge blocks are pressed onto each other by means of a screw spindle, which is rotatable in the gauge block holder and preferably provided with precision threads. For obtaining the correct force on the gauge blocks, the spindle is actuated by means of well determined torque, for instance by means of a torque key.

This invention relates to a means for applying a pressure on a set of gauge blocks in a gauge block holder by means of which the force exerted on the gauge blocks is accurately controllable and a proper indication of said force is obtained. In gauge block holders hitherto used and in which the gauge blocks are pressed against each other by means of a screw spindle under a predetermined torque, deviations from the desired force on the gauge block arise even if the torque exerted on the screw spindle is well defined. This phenomenon is due to uncontrollable friction between the screw spindle and the part in which the spindle is rotated while screwed against the gauge blocks.

According to the present invention the gauge block holder comprises a member for securing the set of gauge blocks in said holder, said member being displaceable in the gauge block holder under the influence of a rotatable screw spindle in a stationary part of the gauge block holder, and provided with an elastic flap, which is arranged at an angle, preferably a right angle, to the direction of movement of the member in the gauge block holder and in fixed relation to said member, one end of said screw spindle coacting with and resting on said flap for pressing the member against a set of gauge blocks inserted into the holder, the member further being provided with means for securing thereto a length measuring instrument, such as a conventional dial indicator, for measuring the movement resulting from the deformation of said flap relative to the main part of the member, in order to obtain a direct indication of the force exerted on the gauge blocks. The member, its flap and the dial indicator thus together form a dynamometer.

The present invention is of special importance for obtaining great accuracy with a measuring tool well known to the art and comprises a rectangular frame having two horizontal end pieces constituting opposite ends of the frame and two vertical frame parts interconnecting said end pieces and constituting the two opposite sides of the frame. Each of the vertical sides of the frame consists of two guide bars arranged adjacent each other in a direction perpendicular to the plane of the frame and at such distance from each other that flat parallel jaws with accurately machined parallel surfaces can be inserted between the guide bars, extending over the gap between the vertical frame parts, with gauge block sets having the same total nominal length arranged between the guide bars and between the parallel jaws in the vertical direction of the frame. Consequently the distance between the parallel jaws is defined by total height of the gauge block sets when said jaws are pressed against the gauge blocks under a force exerted on the jaws. One of the parallel jaws rests against one of the horizontal end pieces of the frame and the other one of said end pieces carries a screw spindle by means of which the other one of the parallel jaws is, by means of an intermediate member, forced towards the gauge blocks and thus held at a desired distance from the first mentioned parallel jaw.

With such a measuring device, however, it has proven to be difficult to attain a satisfactory parallelism between the two parallel jaws, this deficient parallelism furthermore proving to be to a great extent depending on the applied force. Due to the fact that the gauge blocks must be pressed towards each other by means of a force which is well defined and within narrow limits in order to result in correct measures of attainable accuracy, special problems arise in a device of this kind, in which two different sets of gauge blocks are used and both must be compressed by equal forces of predetermined magnitude. Even a slight deviation from an equal distribution of the force necessary for compressing the two systems of gauge blocks may thus give rise to an undesirable oblique position of one of the parallel jaws relative to the other.

With a device according to the invention in which the gauge block compressing means in principle acts as a dynamometer, it has been possible completely to eliminate the disadvantage arising from the intermediate member and the gauge blocks being actuated by an incorrect force. However, as stated above, difficulties arise which are due to the fact that the contact surfaces between and deformations of the parts involved in exerting the force on the parallel jaws and the gauge blocks are not accurately defined and in consequence whereof the force exerted on the intermediate member is not evenly distributed between the gauge block sets.

According to the invention such disadvantages are eliminated by providing two abutment pads as resting points for one of said parallel jaws at the lower one of the end pieces of the frame, one such abutment pad being arranged within the range of said end piece enclosed by a vertical frame part consisting of two bars. Furthermore an intermediate member in the shape of a beam, which is parallel to the two horizontal end pieces of the frame and displaceable between said bars for pressing the parallel jaws and the gauge blocks in a direction towards said pads is provided with corresponding abutment pads, which rest against the second one of said parallel jaws within the range of the vertical frame parts.

In the device described an accurately determined distribution of the force exerted on the beam at its centre point between the two sets of parallel gauge blocks is obtained. The intermediate beam member is, furthermore, provided with an elastic flap secured to or constituting part of the material of the beam and extending parallel to the longitudinal direction of the beam across the frame and on which the force applied when compressing the gauge blocks is exerted. A length measuring instrument, such as a conventional dial indicator, for measuring the deviation of the flap, the instrument and the flap thus together constituting a dynamometer, is arranged for measuring the exact magnitude of the force applied.

An embodiment of the invention, illustrated in connection with a frame designed for holding two sets of gauge blocks, appears from the following description of the accompanying drawings, in which FIGURE 1 represents a device according to the invention in front elevation and FIG. 2 a device according to FIG. 1 in a side elevation.

The device according to the invention as illustrated in the drawings is intended to be used with parallel jaws and gauge blocks as measuring tools as previously described. The device consists of a frame comprising a base piece 1 and a top piece 2, which, at each one of their ends, are secured to pairs of parallel guide bars 3, 3' and 4, 4', respectively, which provide guides for the end portions of parallel jaws 7 and 8. The bars of each pair provide partially enclosed spaces 5 and 6 for the reception of a set of gauge blocks in each. The distance between the parallel jaws 7 and 8 is, in principle, defined by the total outer measure of the two sets of gauge blocks (not shown) respectively, which, in order to obtain accurate parallelism between the parallel jaws 7 and 8 are both equal. For pressing the parallel jaws and the gauge blocks in a direction against the frame base piece 1 a beam 9, also inserted between the pairs of bars 3, 3' and 4, 4', respectively, is displaceable in the longitudinal direction of said bars. The beam 9 is cooperative with a threaded screw spindle 10, which is rotatable in a threaded aperture 11 in the top piece 2 of the frame and by means of which the beam 9 is displaceable in a direction towards and from the frame bottom piece 1. In order to obtain proper guide said spindle 10 is provided with a finger 12 extending through an aperture 13 in beam 9 in which said finger is freely rotatable. The end 14 of the finger rests against the flap 15 of the beam, which flap, in the embodiment shown, is integral with the beam 9 and may conveniently be formed by means of a recess 16. At its end the flap 15 coacts with a suitable dial indicator 18 by means of a lateral projection 17. The dial indicator 18 is secured to the beam 9 by means of a bracket 19 and by means of which the deflection of the flap 15 when applying a force on the beam by means of the screw spindle 10 can be measured. The finger 12 carries a washer 20 acting as an abutment for the beam 9 and by which the beam can be brought back from its contact with the parallel jaw 7 by means of the screw spindle 10.

The contact point between the flap 15 and the end 14 of the finger 12 is located between the parallel bars 3, 3' and 4, 4' respectively, and exactly centrical between two abutment pads 21 and 22, on each end of beam 9 at the undermost side thereof.

Preferably the pads 21 and 22 have spherical contact surfaces adjacent the parallel jaw 7 so that the points at which the force on the flap 15 acts on the jaw 7 are well defined and always the same. The pads 21 and 22 are located in the spaces 5 and 6 between the bars 3, 3' and 4, 4', respectively, so that the force exerted on the parallel jaw 7 is applied at two points which will be directly above the two sets of gauge blocks. Furthermore, corresponding pads 23 and 24, against which the parallel jaw 8 abuts, are arranged at corresponding locations in the base piece 1 of the frame. Preferably the pads 21 and 22 are arranged at the same distance from each other as the pads 23 and 24 and all the pads are near or lie in the median plane of the frame which bisects the spaces 5 and 6.

With a device according to the invention of the kind described it has been possible to avoid every measurable deviation from parallelism between the parallel jaws 7 and 8, the confronting faces of which determine the measure chosen with the gauge blocks.

The device according to the invention as shown in the drawings is arranged on a base 25 and secured to this base by means of a screw 26. Furthermore the device is provided with brackets 27 by means of which the parallel jaws 7 and 8 are retained in contact with the beam 9 and the base piece 1, respectively.

Each bracket 27 is provided with a pin 30, a screw 31, and a lip or flange 32. In the case of the upper brackets 27, the pins 30 and screws 31 secure the bracket to the beam 9, and the lips 32 extend between the parallel guide bars 3, 3' and 4, 4' respectively and engage the jaw 7 to hold it in place. In the case of the lower brackets 27, the pins 30 and screws 31 secure the brackets 27 to the base piece 1, and the lips 32 extend between the parallel guide bars to maintain the lower jaw 8 in its position.

The pads 21 and 22 are secured in the beam 9 by means of bearing studs 28 and the pads 23 and 24, which are shown as being adjustable in the longitudinal direction of the frame, are secured in the base piece of the frame by means of set screws 29. The pads 23 and 24 are threaded at their lower ends in order to provide the longitudinal adjustment referred to, as shown in FIG. 1.

What we claim is:

1. A gauge block holder for pressing a set of gauge blocks toward each other comprising a stationary frame, a screw spindle extending through a portion of said frame and cooperating therewith in screw threaded engagement for exerting pressure on a set of gauge blocks disposed within said frame, a displaceable beam member slidably mounted in said frame and adapted to be displaced by said screw spindle, an elastic flap attached to said beam member and oriented in a direction substantially perpendicular to the direction of the movement of said beam member, said screw spindle engaging the free end of said flap whereby the force exerted by said spindle will be transmitted to said beam member through said elastic flap and will cause elastic deformation of the same, and a dial indicator mounted on said beam member and having a portion engaging said flap for indicating the extent of deformation of said flap with respect to the body of said beam member, whereby the force transmitted to said beam member can be measured by the displacement indicated by said dial indicator.

2. A gauge block holder as claimed in claim 1 in which said stationary frame comprises horizontal top and bottom pieces, and oppositely disposed side frame means connecting the same, each of said side frame means comprising a pair of vertically oriented parallel guide bars spaced from each other to provide a partially enclosed space in which a set of gauge blocks may be disposed, a pair of parallel jaws loosely disposed in said stationary frame, the opposite ends of each jaw extending between said parallel guide bars, the ends of said beam member also extending between said parallel guide bars, the upper one of said jaws being disposed immediately below said beam member, and the lower one of said jaws being disposed immediately above said bottom piece, so that two sets of gauge blocks may be disposed between said jaw members, one set between each of the corresponding ends thereof, whereby the force which is applied to said gauge blocks will be transmitted thereto by said jaws.

3. A gauge block holder as claimed in claim 2 including two lower abutment pads projecting from the upper surface of said bottom piece for engagement by the lower one of said parallel jaw members, each lower abutment pad being located between said parallel guide bars, and two upper abutment pads projecting downwardly from the lower surface of said displaceable beam member for engaging the upper one of said parallel jaws, each upper abutment pad being located between said parallel guide bars and in substantial vertical alignment with one of said lower abutment pads, the point of engagement between said screw spindle and said flap being half way between said upper abutment pads so that the force exerted by said screw spindle will be equally distributed between the ends of said upper parallel jaw.

4. A gauge block holder as claimed in claim 2 including bracket means for maintaining said upper and lower parallel jaws in positions adjacent to said beam member and said bottom piece respectively.

References Cited in the file of this patent

UNITED STATES PATENTS

| | | |
|---|---|---|
| 1,648,895 | Gerdien | Nov. 15, 1927 |
| 2,350,394 | Ellstrom | June 6, 1944 |
| 2,842,854 | Powell | July 15, 1958 |